United States Patent [19]

Ramunas

[11] Patent Number: 4,797,564
[45] Date of Patent: Jan. 10, 1989

[54] ROBOT OVERLOAD DETECTION MECHANISM

[75] Inventor: Valdas S. Ramunas, Euclid, Ohio

[73] Assignee: Erickson Tool Company, Solon, Ohio

[21] Appl. No.: 900,307

[22] Filed: Aug. 25, 1986

[51] Int. Cl.$^4$ .............................. B25J 9/00; B23K 9/12
[52] U.S. Cl. .................................... 307/119; 901/13; 901/17; 901/41; 318/475; 318/469; 307/120
[58] Field of Search ...................... 307/119, 120, 124; 901/11, 14–18, 35, 13, 41, 46; 318/475, 469; 219/124.34, 124.22, 125.1

[56] References Cited

U.S. PATENT DOCUMENTS

| | | | |
|---|---|---|---|
| 3,145,333 | 3/1964 | Pardini et al. | 901/46 X |
| 4,016,803 | 4/1977 | Soby | 901/11 X |
| 4,328,621 | 5/1982 | Benjamin | 901/46 X |
| 4,442,754 | 4/1984 | Jezbera | 901/11 X |
| 4,500,065 | 2/1985 | Hennekes et al. | 901/41 X |
| 4,540,869 | 9/1985 | Yasuoka | 901/13 X |
| 4,564,331 | 1/1986 | Karr-Ake | 901/13 X |
| 4,637,775 | 1/1987 | Kato | 901/41 X |

Primary Examiner—William M. Shoop, Jr.
Assistant Examiner—Sharon D. Logan
Attorney, Agent, or Firm—Pearne, Gordon, McCoy & Granger

[57] ABSTRACT

An overload detection mechanism for a robot is disclosed, wherein first and second members are relatively urged together by an urging means to urge the axis of the second member toward the Z axis of the first member. The second member is guided in any movements departing from coaxial alignment, and the first member is supported near the end of a robot arm. A tool mount or workpiece mount is connected to the second member. An electrical device is mounted on one of the members, and a device actuator on the other of the members, with the reaction means acting between the members to relatively move the members upon tilting from an X-Y plane normal to the Z axis, or axial thrust applied by the tool mount to the second member. In this manner, an overload of a tool in the tool mount establishes relative movement between the first and second members, so that the electrical device is actuated to change an electrical condition thereof and can be connected to stop movement of the robot.

24 Claims, 2 Drawing Sheets

ROBOT OVERLOAD DETECTION MECHANISM

BACKGROUND OF THE INVENTION

Robots have been increasingly used in manufacturing operations to move tools and workpieces. Especially during the set-up operation of the robot, the tool or workpiece is apt to strike some other part of the machinery. This can shear pins or fasteners before the robot can be stopped.

A number of prior patents have dealt with the problem of limiting the force, such as U.S. Pat. No. 3,145,333. U.S. Pat. No. 4,016,803 has suggested use of a servomotor in a robot with a throttled stop of the robot. Other patents have suggested the use of a movable probe to control an electrical transducer to sense the movement of the probe, as in U.S. Pat. No. 4,328,621. U.S. Pat. No. 4,442,754 suggests the use of a compound slide in a fluid-powered positioning system for a robot.

The present invention is a mechanism to detect overload in a robot and to protect a robotic end-of-arm tooling in the event the robot accidentally strikes an object in its path while moving from one point to another. This feature may be of particular significance during initial robot programming when the arm is moving at reduced speed and can halt movement in a short distance after the collision is detected and an electrical signal is sent to the robot control.

SUMMARY OF THE INVENTION

The problem to be solved, therefore, is how to establish an overload detection and protection mechanism for a robot.

This problem is solved by an overload detection mechanism for a robot arm comprising, in combination, a first member having a Z axis, a second member having a second axis, urging means acting between said members to urge said members toward axial alignment on said Z axis, guide means to guide said second member in movements departing from coaxial alignment on said Z axis, means to support said first member near the end of a robot arm, means to connect said second member to a tool mount for the end of a robot arm, an electrical device mounted on one of said members and a device actuator on the other of said members, and reaction means acting between said members to relatively move said members upon thrust along a Z axis, or movement in an X-Y plane normal to said Z axis, whereby, due to overload on said second member, said first and second members are relatively moved and said electrical device is actuated to change an electrical condition thereof.

The overload detection mechanism of the invention provides protection in all three X, Y, and Z axes, and serves three purposes: detection of side, axial or torsional force which is larger than normal for a given operation; the mechanism sends a signal to the robot controller to stop; and limited overtravel is provided to a robot arm during a stopping phase to preclude shearing off any fasteners or pins.

According, an object of the invention is to provide a detection mechanism on the movable portion of a robot to detect an overload or crash condition.

Another object of the invention is to provide an overload protection mechanism for a robot which will be inserted between any wrist of the robot and any end of arm holding device for a tool or workpiece, and which will respond to any radial overload force in the X-Y plane throughout a 360-degree direction, and will also detect a torque overload or direct axial force along the Z axis.

Still another object is to provide a robot overload protection mechanism wherein first and second members are urged together by urging means, and any overload on the robot tends to separate these two members.

Other objects and a fuller understanding of the invention may be had by referring to the following description and claims, taken in conjunction with the accompanying drawing.

DESCRIPTION OF THE PREFERRED EMBODIMENTS

Figure 1:
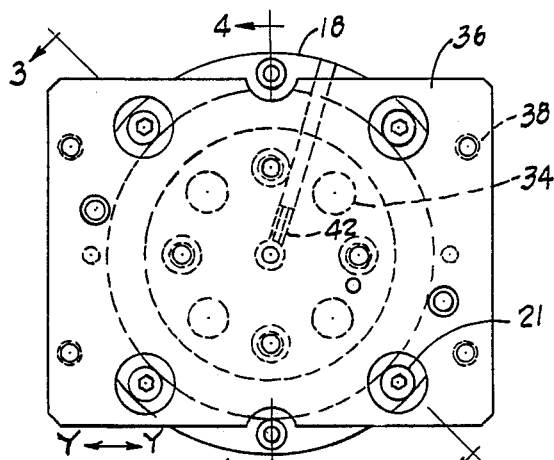
FIG. 1 is a front elevational view of an overload detection mechanism in accordance with the invention.
Figure 2:
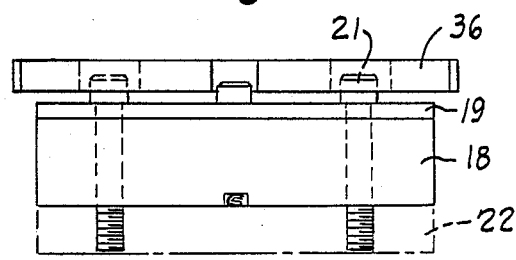
FIG. 2 is a plan view of the mechanism of FIG. 1.
Figure 3:
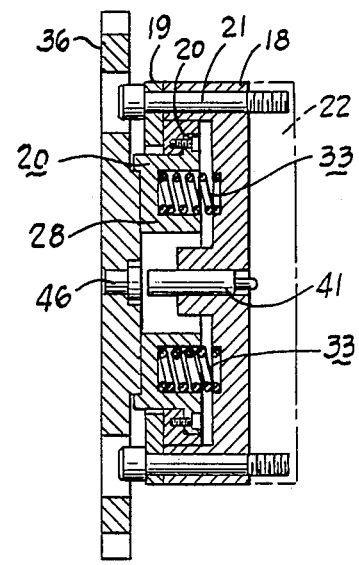
FIG. 3 is a sectional view on line 3—3 of FIG. 1.

FIGS. 1–4 of the drawings illustrate an overload detection and protection mechanism 11 which may be used at the end of a robot arm 12, between this robot arm 12 and a mount 13 for a tool or workpiece, with a deburring tool 14 being shown. This tool may be stationary on the mount 13 or may be rotated, for example, by a motor 15.

The overload detection mechanism 11 includes generally a housing 18 which includes as part thereof a first member 19, and contained within the housing is a second member 20. The first member is an annular disc or washer-shaped member secured by bolts 21 through the housing to a mounting plate 22 which is at the end or wrist of the robot arm 12. The second member 20 is a disc having first and second faces 23 and 24. This disc-shaped second member 20 is in a cylindrical aperture 25 of the housing 18, and the housing 18 has a first face 26 opposing the second member first face 23. The first member 19 has an annular surface 27 opposing the second member second face 24. The second member 20 is shown as a composite member with an easily machinable or die-cast part 28 and a second part 29 which is in annular hard wear-resistant material. In this part are tapered depressions, for example, radial V-shaped depressions 30. These correspond with projections 31 on the first member 19. There are a plurality of these projections 31 which are substantially equally spaced around the periphery and in the preferred embodiment, these are four in number and are pins with conical ends, the pins being carried in the first member 19. Each tapered pin is disposed in a respective one of the tapered depressions 30. The second face 24 of the second member 20 is a flat, annular surface, except for the tapered depressions 30, and this second face 24 is urged into engagement with the annular surface 27 of the first member 19 by urging means 33. In this embodiment, the urging means 33 is a plurality of compression springs disposed in spring pockets 34 in the first part 28 of the second member 20.

A top plate or mounting plate 36 is secured to the second member 20 by means of bolts 37, and this mounting plate 36 is for securing the tool mount 13 to the overload mechanism 11. The mounting plate 36 has threaded apertures 38 for this purpose.

An electrical device is mounted on one of the members 19 and 20 in order to detect relative movements therebetween. In this embodiment, the electrical device is mounted on the housing 18 which is fixed relative to the first member 19. This electrical device is shown as a switch, such as a proximity switch 41, held in place by a setscrew 42. Electrical leads 43 lead from this switch 41 to a control 44, which is connected to control a drive 45 for the robot arm 12. An electrical device actuator is mounted on the other of the members, and in this embodiment is a steel target 46 mounted in the mounting plate 36 to cooperate with the proximity switch 41.

Figure 4:
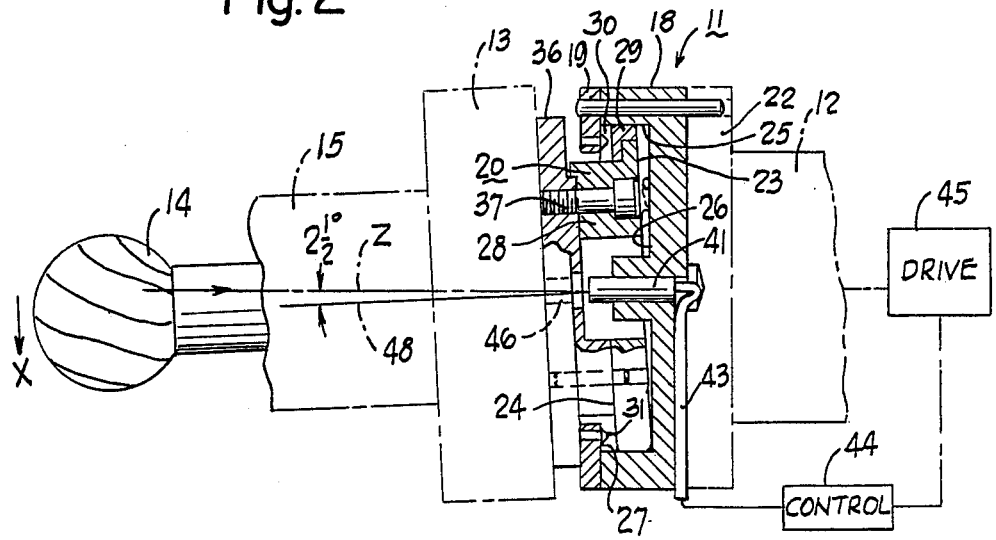
FIG. 4 is a sectional view on line 4—4 of FIG. 1.
Figure 5:
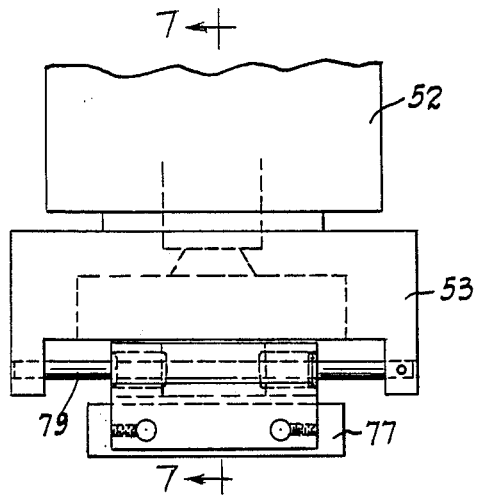
FIG. 5 is a plan view of a modified form of overload detection mechanism according to the invention.

The first member 19 has a Z axis, and the second member 20 has a second axis 48. The urging means 33 urges these two members together toward axial alignment on the Z axis. The housing cylindrical aperture 25 closely receives the outer cylindrical surface of the disc-shaped second member 20 to act as a guide means to guide this second member in movements departing from coaxial alignment on the Z axis. The members are shown coaxially aligned in FIG. 3, and are shown displaced in FIG. 4. This would be the case with an overload on the tool 14 to overcome the urging force of the springs 33. This spring force may be varied by selecting the force and number of the compression springs 33. This overload force in FIG. 4 is illustrated as being a downward force in the X direction of an X-Y plane which is normal to the Z axis. Since both the first and second members 19 and 20 are circular in shape, the overload which will cause tilting of the circuit member 20 will be uniform in the X-Y plane around the Z axis by compressing the respective ones of the compression springs 33. Also, an overload axial force along the Z axis will compress all of the springs. Further, a rotational or torque overload on the tool 14 about the Z axis will cause the V-shaped tapered depressions 30 to coact with the tapered pins 31 as reaction means acting between the members to move the second member 20 to the right in FIG. 4 against the force of the springs 33. All three of these different forces will bring the target 46 closer to the proximity switch 41 to change the electrical condition of this switch. This may be from open-to-closed, or from closed-to-open, as desired. Such changed switch condition will detect the overload condition, and can at through the control 44 so as to stop the drive 45 before harm is done to the machinery. This is especially true in set-up operations of the robot where the robot will be moving slowly. Such rapid stopping will prevent any shearing of any pins or fasteners, and hence prevent damage to the machinery or the robot.

Figure 7:
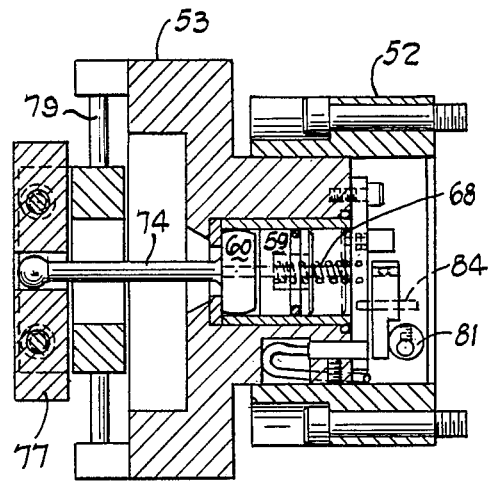
FIG. 7 is a sectional view on line 7—7 of FIG. 5.
Figure 6:
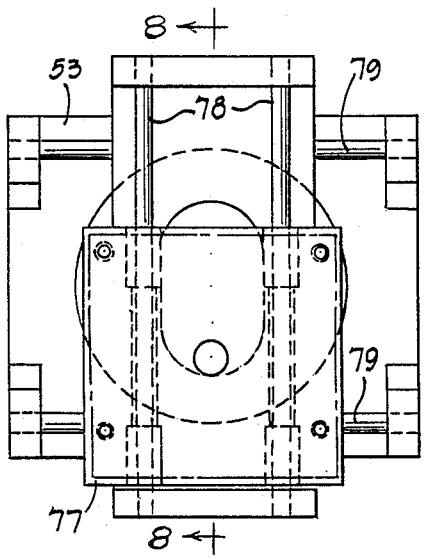
FIG. 6 is a front elevational view of the mechanism of FIG. 5.
Figure 8:
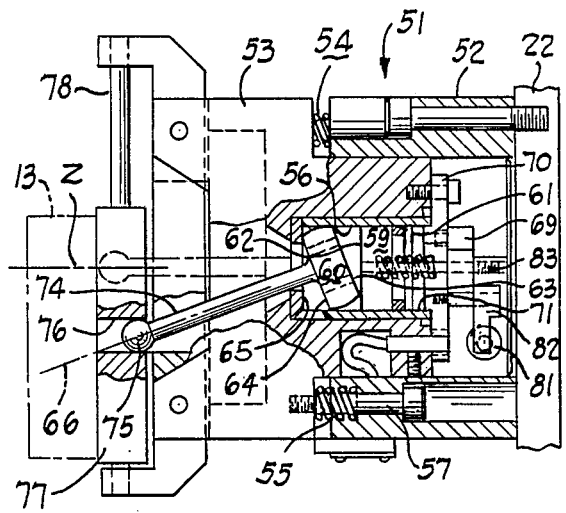
FIG. 8 is a sectional view on line 8—8 of FIG. 6.

FIGS. 5–8 show a second embodiment of the invention in an overload detection mechanism 51. This detection mechanism has first and second housings 52 and 53, respectively, the first housing 52 being secured to the mounting plate 22 on the end of the robot arm, as shown in FIG. 4. The second housing 53 is slidable along the Z axis within the first housing 52, and these housings are urged apart by urging means 54, which includes compression springs 55 on bolts 57 securing together the housings for translation. The second housing 53 has a cylindrical aperture 56 in which are disposed first and second members 59 and 60, respectively. The first member 59 is disc-shaped and has first and second faces 61 and 62. The second member 60 is also disc-shaped and has first and second faces 63 and 64. The cylindrical aperture 56 has an end wall 65. In this embodiment, the first member 59 is again disposed along the Z axis, and the second member 60 has a second axis 66. The urging means 54 is dispsoed to urge the first and second members into coaxial alignment on the Z axis, as shown in FIG. 7, and with the second axis 66 shown displaced from the Z axis in FIG. 8. This urging means 54 includes a compression spring 68 which is coaxial with the Z axis. An alternative urging means is air pressure furnished by a fitting 69 through a rear plate 70 to a cylinder 71 at the rear of the cylindrical aperture 56 and between the rear plate 70 and the first member 59 as a piston. This pneumatic piston may be an alternative to or an adjunct to the compression spring 68, and permits ready change of the force urging the second member 60 into coaxial alignment along the Z axis. The second face 62 of first member 59 abuts the first face 63 of second member 60 under the urging of the urging means 54 in order to urge this second member 60 toward alignment on the Z axis.

The second member 60 has a lever arm 74 extending along the second axis 66, with a ball end 75 disposed in a cylindrical aperture 76 in a compound slide 77. This compound slide is slidably journaled on rods 78 for movement in the X direction, and the rods in turn are slidably journaled on rods 79 for movement in the Y direction. These rods 79 are carried on the second housing 53, and this permits, to a limited extent, free movement of the compound slide 77 in the X-Y plane normal to the Z axis. The compound slide 77 is adapted to carry the tool mount 13, just as in the embodiment of FIGS. 1–4.

An electrical device, such as a proximity switch 81, may be mounted in the first housing 52 and actuated by a steel target 82 carried on a coaxial rod 83 mounted in the first member 59. The steel target 82 is guided on a guide rod 84 so that the target 82 cooperates with the proximity switch 81, and will change electrical condition in the change from the position of FIG. 7 to the position of FIG. 8. This will be with an overload condition on the tool mount 13 by overload movement on the tool mount 13 in the X-Y plane. Also, it can be an overload torque condition, since housing 53 cannot rotate due to bolts 57, and this torque overload will result in movement of compound slide 77 in the X-Y plane, to tilt the lever arm 74. Axial movement will also move the compound slide 77 axially and move the second member 60 axially against the urging of the compression springs 55. In any one of these three overload conditions, the proximity switch will be actuated. The edge of face 65 of the second member 60 will act as reaction means and react against the end wall 65, in FIG. 8, and the edge of face 63 of second member 60 will react against face 62 of the first member 59, during tilting movements of lever arm 74. Alternatively, the target 82 may be a linear variable displacement transducer, and the guide rod 83 may be the core thereof, so that the relative movement under overload conditions will provide a changed electrical condition—in this case, directly linearly proportional to the amount of displacement. This electrical signal may be used to measure the distance moved, and hence the amount of overload force.

The linear variable displacement transducer or the pneumatic spring, or both, may be utilized in the embodiment of FIGS. 1-4, just as they are shown in FIGS. 5-8.

The embodiment of FIGS. 5-8 permits a relatively greater amount of displacement of the tool mount 13 relative to the robot arm, and also establishes that the axis of the tool mount remains parallel to the Z axis despite this overload displacement. This can be beneficial during many operations, such as deburring operations.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit and mechanical elements may be resorted to without departing from the spirit and the scope of the invention as hereinafter claimed.

What is claimed is:

1. An overload detection mechanism for a robot arm comprising, in combination:
   a first member having a Z axis;
   a second member having a second axis;
   urging means acting between said members to urge said members toward axial alignment on said Z axis;
   guide means to guide said second member in movements departing from coaxial alignment on said Z axis;
   means to support said first member near the end of a robot arm;
   means to connect said second member to a tool mount for the end of a robot arm;
   an electrical device mounted on one of said members and a device actuator on the other of said members; and
   reactions means acting between said members to relatively move said members upon thrust along a Z axis, or movement in an X-Y plane normal to said Z axis, whereby due to overload on said second member said first and second members are relatively moved and said electrical device is actuated to change an electrical condition thereof.

2. An overload detection mechanism for a robot arm as set forth in claim 1, wherein said second member is disc-shaped.

3. An overload detection mechanism for a robot arm as set forth in claim 1, wherein said urging means is a mechanical spring.

4. An overload detection mechanism for a robot arm as set forth in claim 1, wherein said electrical device is a switch connected to stop the movement of the robot arm.

5. An overload detection mechanism for a robot arm as set forth in claim 1, wherein said electrical device is a proximity switch.

6. An overload detection mechanism for a robot arm as set forth in claim 1, wherein said electrical device is a linear variable displacement transducer to determine the amount of overload movement.

7. An overload detection mechanism for a robot arm as set forth in claim 1, wherein said reaction means includes a plurality of depressions in one of said members substantially equally spaced around said Z axis and a plurality of reaction elements one each receivable in a respective depression and acting on the other of said members to be responsive to torque overload around said Z axis.

8. An overload detection mechanism for a robot arm as set forth in claim 7, wherein said depressions are V-shaped depressions.

9. An overload detection mechanism for a robot arm as set forth in claim 7, wherein said reaction elements are pins with conical ends to engage respective depressions.

10. An overload detection mechanism for a robot arm as set forth in claim 1, wherein said guide means includes a housing fixedly attached to said first member and housing said second member.

11. An overload detection mechanism for a robot arm as set forth in claim 10, wherein said second member is a disc having first and second faces, and said housing has a cylindrical opening receiving said disc.

12. An overload detection mechanism for a robot arm as set forth in claim 11, wherein said housing has a first face opposing said disc first face and an annular surface opposing said disc second face.

13. An overload detection mechanism for a robot arm as set forth in claim 12, including tapered depressions in said disc second face and said reaction means are pins carried in said housing annular surface.

14. An overload detection mechanism for a robot arm as set forth in claim 13, wherein said urging means is a compression spring acting between said first faces.

15. An overload detection mechanism for a robot arm as set forth in claim 1, wherein said urging means is a pneumatic piston and cylinder.

16. An overload detection mechanism for a robot arm as set forth in claim 1, including a compound slide movable in said X-Y plane and connected to move said second member.

17. An overload detection mechanism for a robot arm as set forth in claim 1, including housing means as a part of said support means and mountable on the end of the robot arm, said housing means containing said first member.

18. An overload detection mechanism for a robot arm as set forth in claim 1, including a first housing as a part of said support means and mountable on the end of the robot arm.

19. An overload detection mechanism for a robot arm as set forth in claim 18, including a second housing as a part of said support means and axially slidable in said first housing.

20. An overload detection mechanism for a robot arm as set forth in claim 19, wherein said guide means is a cylindrical aperture in said second housing and contains said first and second members.

21. An overload detection mechanism for a robot arm as set forth in claim 20, wherein said first and second members are disc-shaped and urged together by said urging means.

22. An overload detection mechanism for a robot arm as set forth in claim 19, wherein said first and second housings are urged apart by said urging means.

23. An overload detection mechanism for a robot arm as set forth in claim 21, wherein said second member has a lever arm connected to one face of the disc, with said lever arm extending along said second axis and movable by an overload condition.

24. An overload detection mechanism for a robot arm as set forth in claim 22, wherein said connection means includes a platform movable in said X-Y plane and connected to move said lever arm second axis off said Z axis upon an overload condition.

* * * * *